(No Model.) 3 Sheets—Sheet 1.
E. T. STARR.
CONDUIT FOR UNDERGROUND ELECTRIC CONDUCTORS.
No. 291,798. Patented Jan. 8, 1884.
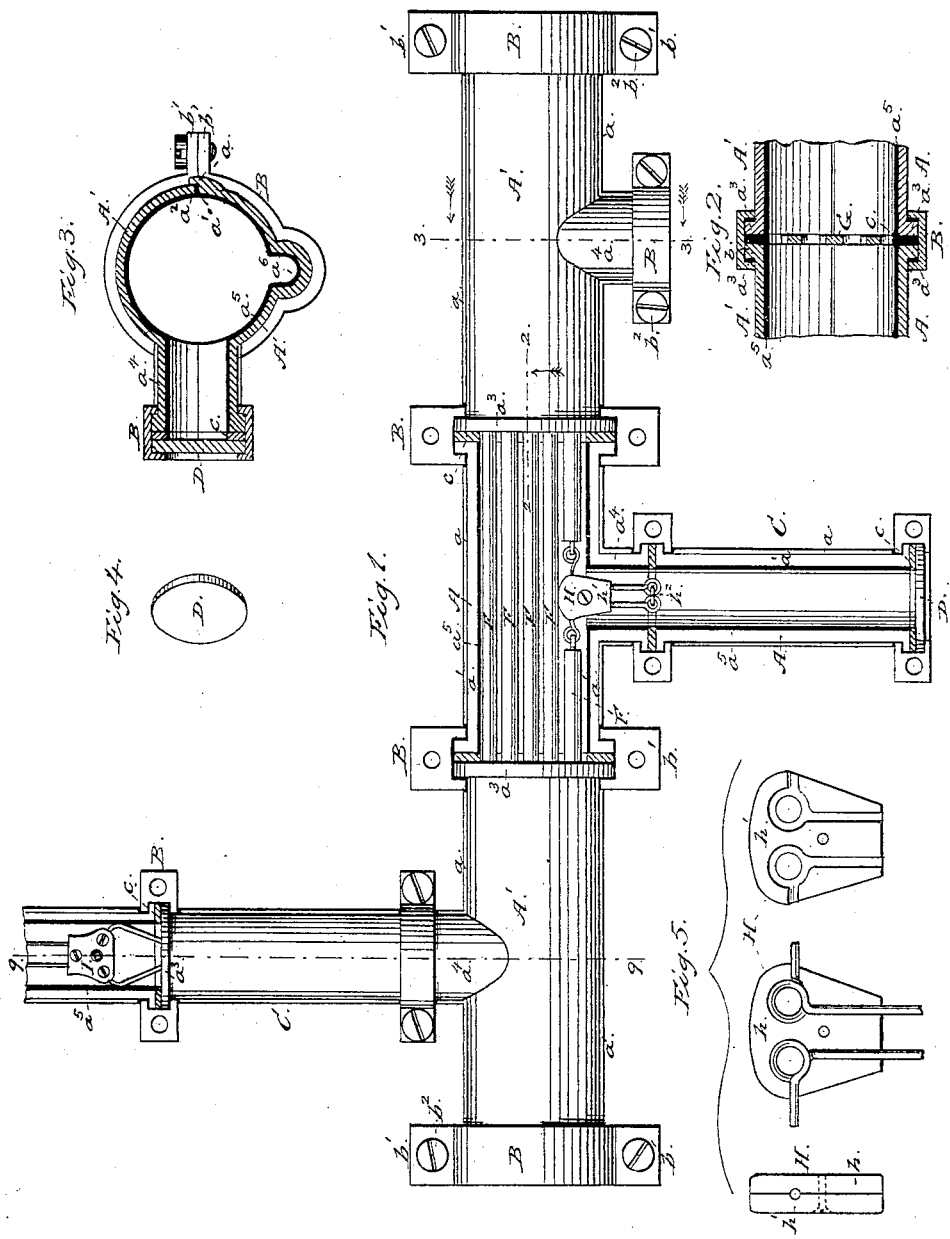
Attest:
F. W. Howard.
P. J. Lancaster.
Inventor:
Eli T. Starr,
by his Atty
Wm. J. Peyton.

(No Model.) 3 Sheets—Sheet 2.
E. T. STARR.
CONDUIT FOR UNDERGROUND ELECTRIC CONDUCTORS.
No. 291,798. Patented Jan. 8, 1884.
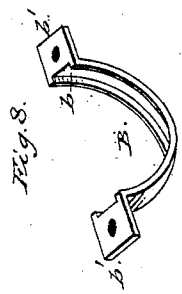
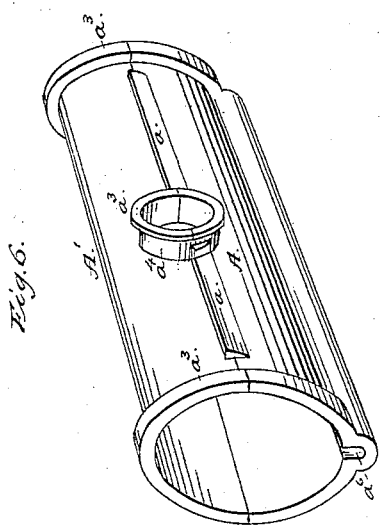
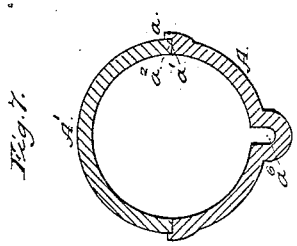
Attest:
F. W. Woodward
O. J. Lancaster
Inventor:
Eli T. Starr,
by his Atty
Wm. J. Peyton.

(No Model.)
3 Sheets—Sheet 3.
E. T. STARR.
CONDUIT FOR UNDERGROUND ELECTRIC CONDUCTORS.
No. 291,798. Patented Jan. 8, 1884.
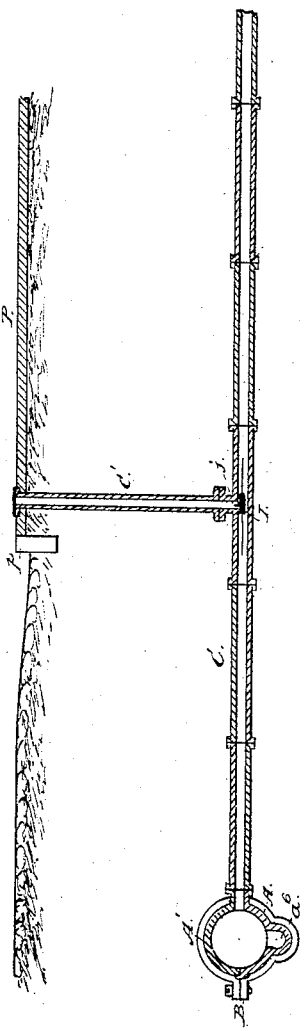
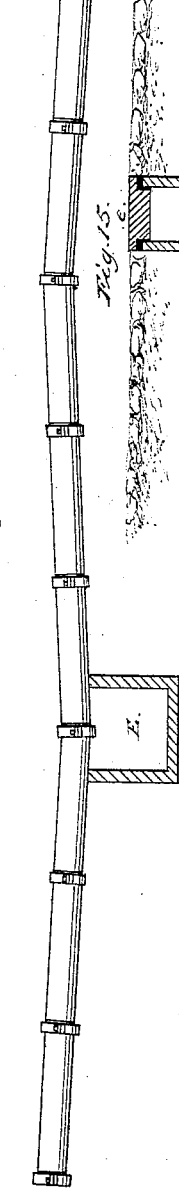
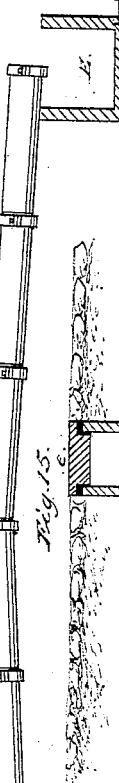
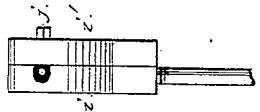
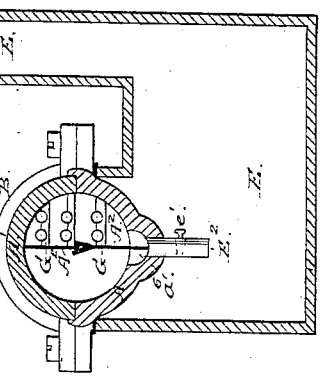
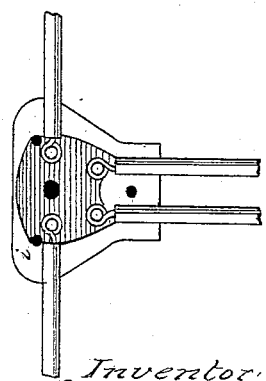
Attest;
F. W. Howard
P. I. Lancaster
Inventor;
Eli T. Starr,
by his Atty
Wm. J. Peyton.

UNITED STATES PATENT OFFICE.

ELI T. STARR, OF PHILADELPHIA, PENNSYLVANIA, ASSIGNOR OF ONE-HALF TO WILLIAM J. PEYTON, OF WASHINGTON, D. C.

CONDUIT FOR UNDERGROUND ELECTRIC CONDUCTORS.

SPECIFICATION forming part of Letters Patent No. 291,798, dated January 8, 1884.

Application filed May 25, 1882. (No model.) Patented in England July 13, 1882, No. 3,330.

*To all whom it may concern:*

Be it known that I, ELI T. STARR, of the city and county of Philadelphia, in the State of Pennsylvania, have invented certain new and useful Improvements in Conduits for Underground Electric Conductors, of which the following is a specification.

My invention relates to conduits for electric conductors designed to be laid underground, so as to convey currents of electricity from a generator or generators to the point or points where the current or currents are to be utilized.

The necessity for a thoroughly practical and economical system of underground conduits for electric conductors has long been felt, and many attempts have been made to attain the ends desired with more or less success. As far as I know, however, there has heretofore been no underground system produced which meets all the requirements demanded of such a system—that is, one in which the conduit is simple, comparatively economical, easily and rapidly laid, free from the accumulation and injurious action of moisture upon the wires, and which affords ready facility for reaching the conductor or conductors at any point desired for repair or renewal, or for the ready connection of branch lines or circuits, without destroying any part of the conduit or rendering necessary the disturbance of any part thereof save at the precise point at which the work of repair, renewal, or branching is to be effected.

The object of my invention is to furnish a comparatively economical system of underground or subterranean conduits and such a method of laying them and their conductors or wires as will meet all the practical requirements demanded of such a system.

My improvements will first be set forth in a description of them as organized or embodied in the best way now known to me, while the subject-matter claimed will be particularly pointed out at the close of the specification.

I wish it understood that some of my said improvements may be used without the others and in ways differing from that herein described and shown.

In the accompanying drawings, which show so much of an underground conduit embodying my improvements as is necessary to illustrate the subject-matter claimed, Figure 1 is a plan view of a portion of the improved conduit, with the top part or half of one of the longitudinally-divided pipe-sections of the main conduit and of one of the branch conduits thereof removed to show the internal arrangement of the conductors and the method of making a loop or a branch circuit connection with one of the main wires or conductors, the top part of another branch conduit, at the left hand of the figure, being also removed to show a switch arrangement by which the branch circuit or loop connection may be made and broken from the surface of the ground. Fig. 2 is a vertical longitudinal section on the line 2 2 of Fig. 1, omitting the channel at the bottom, showing, particularly, the method of connecting the adjacent ends of two of the pipe-sections of the conduit by means of a sectional clamp collar or coupling, with a packing-washer between the pipe ends, the view also showing in section the cross-bars or supports for the conducting-wires. Fig. 3 is a cross-section through one of the pipe-sections on the line 3 3 of Fig. 1, showing particularly the union or opening for the branch conduit, with a stopper or disk in its outer end to close the opening; and Fig. 4 is a perspective view of said stopper. Fig. 5 shows the details of construction of the coupling or connection for a main wire or conductor located at each branch opening or union in the main conduit, to facilitate the making of branch or loop circuit connections without uncovering or disturbing said conduit. Fig. 6 is a perspective view of one of the longitudinally-divided pipe-sections, showing its construction. Fig. 7 is a cross-section thereof, and Fig. 8 is a perspective view of one-half of the sectional or divided clamp collar or coupling which unites the adjacent ends of two such pipe-sections. Fig. 9 is a sectional view on the line 9 9 of Fig. 1, showing more particularly the location of the cut-out switch in the branch pipe and the manner of gaining access thereto from the surface of the ground to work said switch; and Fig. 10 is a view of a long-shanked key or spanner wrench to work said cut-out switch. Figs. 11 and 12 are views of the inner faces of the two parts or halves of said cut-out switch, which are fitted together and united; and Fig. 13 is an edge view of said switch. Fig. 14 is a view showing the conduit as provided at points along its length with wells for the collection of the waters of condensation and leakage, the conduit having openings communicating with said wells, so as to discharge therein any water which may form in or gain access to said conduit; and Fig. 15 is an enlarged view of one of said wells, showing an extension thereof as leading to the surface of the ground, to afford ready access for pumping out the water collected in the wells at proper times.

The conduit is composed, preferably, of tubular pipe or conduit sections, of the desired length convenient for handling and laying—say, ten feet long, more or less—and each section is divided longitudinally into, preferably, two halves or portions, A A'. The lower half or portion, A, of the conduit-sections is provided with a longitudinal rib or flange, $a$, on each edge, which forms an inner ledge, shoulder, or seat, $a'$, to receive the opposing longitudinal edges $a^2$ of the upper halves or portions, A', so that the longitudinal edges of the two halves A A' may be nicely fitted together with an external flange to protect the joint. A suitable thin packing strip or substance may be interposed between the edges of the pipe-sections, which, in addition to a packing of clay or some suitable cement along the longitudinal joints at the outside, insures as near as possible a fluid-tight joint. At each end of each conduit or pipe section a circumferential or annular coupling-flange, $a^3$, is formed, so that when the two ends of adjacent pipe-sections are brought together the coupling-flanges of said sections may be readily coupled or united together by means of sectional clamp collars or rings B, having annular internal grooves or recesses, $b$, in which the annular flanges of the pipe-sections snugly fit. Each section of the divided clamp-collar B is provided with ears $b'$, having bolt-holes passing through them, whereby the sections of the collars, when fitted so as to encompass the flanged ends of two adjacent conduit-sections, may be readily and securely fastened together by bolts and nuts of the usual kind. (Screws $b^2$ are shown as the fastenings of the clamp-collars in the drawings for the purposes of clearer illustration.)

It will be understood that in applying the coupling-clamp collars B a packing material may be employed in the grooves or recesses thereof, which packing I prefer to be soft or plastic—like a cement, for example—and possess the capability of readily "setting" or hardening, while the external joints of the clamps, after they are firmly united around the pipe ends, will be packed or covered with a suitable material—such as clay or cement—like, for example, the external packing or covering to be applied to the longitudinal joints of the conduit. The recesses in the clamp-collars B are made sufficiently wide, not only to receive the flanges of the ends of the adjacent pipe-sections, but also to permit a packing ring or washer, $c$, to be placed between the ends of said pipe-sections, in order to secure a tight joint. This washer or packing-ring is shown by the solid black space $c$ in Fig. 2, while in the other figures in which it is illustrated it is shown in section. I prefer these washers to be formed of a material which is sufficiently elastic to permit slight play of the pipe ends in their coupling-clamps, to accommodate strains and expansion and contraction, and I also prefer said washers to be of a material that will absorb moisture and swell under such action, in order to make a thoroughly tight while at the same time elastic or yielding joint. I have found the substance well known in the arts as "vulcanized" fiber to be particularly well adapted for this purpose, inasmuch as that material will absorb or take up moisture and expand and swell by that means.

Inasmuch as it is practically impossible to exclude all moisture from underground pipes, the advantages due to the use of the washers I have described are twofold. They not only take up moisture to relieve the wires of its injurious tendencies, but in addition improve the tightness of the joints by the absorption process. These vulcanized-fiber washers are, moreover, good electric insulators, while they may be used with economy.

From what has been said as to the structure of the pipe-sections and the means for joining them together it will be seen that while a tight pipe or conduit is secured, yet at the same time the sections thereof are easily handled, readily laid, and quickly and securely joined together, the structure of the conduit also affording ready means of access to the wires or conductors inclosed within it at any point, due to the facility with which the coupling-connections may be taken off and put on and the top part or portion of the pipe-sections removed and replaced.

The form of the halves or portions of the longitudinally-divided pipe-sections and of the clamp-collars has been devised with the especial object of enabling them to be cast and fitted with rapidity and economy. A sufficient number of the pipe-sections—every alternate one, for example—has cast with its parts or members a union or coupling piece, $a^4$, to afford a ready means for connecting branch conduits C, as clearly shown in Figs. 1, 3, and 9. These branch conduits C are preferably constructed in the same way as the larger or main conduit, and the longitudinally-divided pipe-sections united and coupled in the same way.

In Fig. 1 I have shown each of the three main conduit-sections illustrated as provided with unions $a^4$ for branches; but it will of course be understood that these union-sections may occur in the conduit as often only as may be desired. The main conduit may be first laid and the branches afterward joined or connected as circumstances require.

In order to stop the branch openings until branch conduits are to be laid, I employ stoppers or disks D, which take the place of one of the flanged pipe ends of the branch conduits in the clamp-coupling B, as clearly shown in section in Fig. 3, the stopper or disk being shown in perspective in Fig. 4.

By interposing a washer, $c$, between the stopper or disk D and the annular end of the union-piece $a^4$ a perfectly tight joint is secured, a suitable cement or filling for the joint being also applied externally to increase the security of the joint, as before described, for the clamp-joints at the ends of the main conduit-pipes.

When a branch conduit is to be connected with the main conduit, it is only necessary to remove the upper section of the sectional clamp-ring B from the end of the union-piece $a^4$, remove the stopper or disk D, and substitute for said stopper the annularly-flanged end of the branch pipe. The upper section of the coupling-clamp is then replaced, so as to embrace the pipe-flange in place of the stopper, and the two clamp-sections are then firmly bolted together, as before described, the joints of the longitudinally-divided branch sections being packed or cemented as described in connection with the main sections.

Instead of the branch conduit being made up of longitudinally-divided pipe-sections, the pipe-sections may be in one piece, if desired, and coupled together by the sectional clamp-coupling, as before described, or in other ways.

It will be noticed that the side flanges, $a$, of the main and branch pipe sections terminate just before reaching the annular or coupling flanges $a^3$ at the ends of said sections, and this is for the purpose of enabling the sections of the clamp-rings B to fit snugly around the ends of the pipe-sections to make tight joints.

I prefer the longitudinally-divided pipe-sections A A' to be cast of iron, for durability and strength, and these sections will be internally lined or coated with an insulating vitreous, resinous, asbestus cement, or other material, $a^5$, (shown by the heavy black lines in Figs. 1, 2, and 3;) or the interior of the pipe-sections may be coated with clay burned to a glaze, if desired. The conduit may also be externally coated with a bituminous or other material, if desired. These pipe insulating, coating, or covering features, however, are well known, and may be varied in many ways.

It is almost if not entirely impossible, with any degree of economy, to secure absolutely tight joints in an underground conduit or system of pipes of considerable length. Therefore, while securing as tight joints as is consistent with economy throughout the conduit and its branches, in order to prevent the entrance of water I have shown the conduit as provided at points along its length with wells or receiving-cisterns E, with which the conduit communicates, by suitable openings or pipes, so as to discharge into said wells or receivers the water that may leak or be forced into the conduit as well as that due to condensation therein. Said wells or receivers should be located at the lowest points in the line of the conduit, so that the water may flow by gravity into them, to be pumped out at the proper times or as occasion requires.

When the ground in which the conduit is laid is level for considerable distances, the conduit should be laid as shown in Fig. 14, in order to produce declines or descents terminating in the wells, which collect the moisture or convey it away. Of course the wells will be at comparatively long distances apart, the few sections of pipe depicted in Fig. 14 being merely for the purpose of illustrating this part of my improved system.

In Fig. 15 a sectional view of one of the wells or receivers E, on a larger scale than that of Fig. 14, is shown, so as to illustrate it more fully, the larger portion of the well or tank, which is preferably water-tight, (and which may be built of masonry-work, iron, or in other ways,) lying below the conduit, while a side extension, E', of said well reaches to the surface of the ground, its opening at the top being covered by a tight-fitting plate or cover, $e$, to prevent the entrance of water or moisture in that direction.

When sufficient water has accumulated in the wells to be removed, a pump is inserted and the water drawn off and discharged, so as to make its way into an adjacent sewer, for example. It will of course be understood that the wells or receivers may communicate with a sewer, so as to permit the water to run off into the sewer when desired, instead of being pumped out. In some instances I prefer the wells or tanks E and the openings leading therefrom to the surface of the ground to be sufficiently large to permit of the entrance of an inspector or workman, and for the further purpose of enabling the discharge-openings from the conduit to the wells to be closed or cut off by turning cocks or valves $e'$, for example, in the respective discharge-pipes E². By this means I am enabled at times to make the conduit a virtually closed one from end to end, or from any one point in its length to another, whereby I may force air (heated, if desired) through the conduit by means of a blast or exhaust, in order to expel and carry off the moisture which may settle in the pipes and upon the wires or conductors, and which may not be drained off into the wells or receivers E. I may also by this means force insulating material or liquid through the conduit temporarily and then withdraw it, or the greater portion of it, whereby the wires or conductors within the conduit may be kept perfectly preserved and secure in their insulation for many years.

I have deemed it unnecessary to show or particularly describe apparatus for supplying the conduit at intervals with the preservative fluid in carrying into effect my improved method of preserving the insulation of the conductors, as various forms of apparatus suitable for the purpose are well known in the art.

In order to facilitate the drainage of the water from the conduit and prevent its contact with the conducting-wires in the body of the conduit in its passage, I may cast or form in the bottom of the lower half, A, of the pipe or conduit sections a longitudinal channel or groove, $a^6$, (clearly shown in Figs. 3, 6, 7, 9, and 15,) which, when the pipe-sections are connected together, constitutes a continuous channel throughout the length of the conduit, save at the points where it discharges into the collection or receiving wells. This channel is not necessary to the drainage of the conduit, but is desirable, as it affords a passage-way for the escape of the water apart or away from the wires in the conduit, so that the water is not brought in contact with said wires during its escape. Of course the lower sections of the clamp collars or couplings B will be formed so as to conform to this external shape of the lower half of the pipe-sections. It will also be understood that the conduit may not be run directly over or through the well or receiver, as shown, nor be supported thereby, but that changes may be made—as, for instance, the discharge of the conduit may take place through pipes connecting the conduit with the well or with a sewer, as before mentioned.

The advantages of having a constant drain to conduct off any water that may gain access to the conduit, or that may condense therein, so as to prevent it from collecting around and upon the conductors or wires, are so obvious as not to need elaboration.

The conductors, wires, or cables F, which are inclosed in the conduit, may be of the ordinary kind, each wire, if single, being preferably separately insulated in well-known ways, and these wires or conductors are supported at proper distances apart and at suitable points in the conduit by supports, which may consist of simple transverse horizontal bars G, of non-conducting material, grooved for the reception of the wires. These bars may be laid across the conduit-pipe at required points in its length, one above the other, and supported by the sides of the conduit and by connections with each other. Fig. 2 shows a vertical cross-section through said bars, while Fig. 15 shows an end view thereof, the supporting-bars in this latter figure, however, only extending half-way across the conduit, being supported at their inner ends, at the middle of the pipe, by a longitudinal division-plate, $A^2$, cast with or inserted in said pipe for the purpose more effectually of dividing the wires throughout the conduit into two distinct sets, such an arrangement being important in certain instances.

Any of the well-known and suitable ways of supporting the separate wires (or the compound cables, if such be used) in the conduit and keeping them taut may of course be employed in place of that described. It will also be understood that the various wires in the conduit may be employed to conduct electric currents for different purposes—such as telegraphing, supplying electric lamps, &c.

In order to facilitate the making of branch or loop circuit connections, to conduct the current from a main wire or conductor to the points along the line of the conduit where it is to be utilized, I preferably sever the conductor or wire which is to be branched or looped before the conduit is closed, and connect its ends by an insulating-coupling, H, opposite the branch openings in the conduit, which coupling, while it maintains the continuity of the conductor through the conduit, and enables it to be kept taut and properly supported, permits of the ready branching or looping of the conductor without cutting into the conduit or uncovering the other wires inclosed therein. Said coupling H may consist of two flat triangularly-shaped halves or pieces $h$ $h'$, of non-conducting material, fitted together and securely connected, as, for instance, by a screw or screws. The ends of the conducting-wire which is to be branched or looped are passed into the coupling at its larger end from opposite sides, given a twist, coil, or bend, to keep them from pulling out of the coupling, and then conducted out of said coupling at the opposite or smaller end, as shown in Figs. 1 and 5. Outside the coupling body the ends of the wire are connected, by a wire link, $h^2$, for example, to bind them together and constitute a conducting-connection between them, so that until this connection is severed the conductor is virtually a continuous metallic wire.

In Fig. 5 the details of construction of the simple form of coupling H, described above, are shown, while in Fig. 1 the position the coupling occupies relatively to the branch opening or union of the conduit is also illustrated. These couplings may be opposite or in every branch opening, or may form parts of the conductor or conductors as often only along its or their length as may be desired.

It will be obvious that various ways of coupling a wire or wires opposite the branch opening may be substituted for that shown without departing from my invention. It will also be understood that more than one of the main wires may be coupled, as described, opposite the same opening or openings, and that these couplings may be independent, or a common coupling-body be employed for several wires. When a branch circuit or loop is to be made, all that is necessary is to remove the plug or stopper D, before described, of the branch opening, connect the branch or loop wires with the projecting ends of the main wire or conductor, and then sever the link-connection $h^2$, so as to break the conducting-connection thereof, whereby it will be obvious that the current will be conducted over said loop-circuit to work the apparatus included therein. Of course the conducting-connection $h^2$ between the coupled ends of the wire may be broken before connecting the branch wires. This method of facilitating the making of branch or looped connections with the conducting-wires of the conduit is important, especially in electric-light and power-distributing systems—for instance, where separate branch or looped connections will be run into house after house along the same block or street long after the laying of the main conduit. The process of cutting into the conduit or of digging up whole sections in order to make the connections is avoided by my invention, while the main conducting-wire, until the branches are effected, is exactly in the same condition electrically as though the wire were a continuous uninterrupted one running through the conduit.

In order to enable the branched or looped lines, and the apparatus worked thereby, to be readily cut out from the surface of the ground, I have inserted in the branch conduit a switch, I, forming part of the branch circuit, and located directly under an opening in the upper side of the branch conduit, the opening being surrounded by a water-tight pipe or casing, C', leading from the conduit to the surface of the ground, and closed by a tight-fitting cover. By removing this cover and inserting a long-shanked key or spanner, J, Fig. 10, the switch may be operated, so as either to short-circuit the current from the main conductor or permit it to flow over the entire branch circuit, as desired.

In Fig. 9 the branch conduit C is shown as running from a main or street conduit under a pavement, P, and the cut-out switch as located just inside the curb-line $p$.

A simple form of cut-out switch is shown in Figs. 11, 12, and 13, consisting of two flat pieces, $i\ i'$, of non-conducting material, through which the circuit-connections of the branch or loop are completed. The leading and return wires of said circuit pass from the coupling H to the metal pins $i^2\ i^2$, around which the ends of said wires are coiled, so as to make a secure conducting-connection. Said pins $i^2\ i^2$ are electrically connected by metal plates $i^3\ i^3$ with metal pins $i^4\ i^4$, to which the ends of the continuation of the leading and return wires are connected.

Pivoted intermediately of said plates $i^3\ i^3$ is a metal wedge-plate, $i^5$, the pivot of which on the outside of the insulated switch-case $i\ i'$, terminates in a squared end, $j$, over which the key or wrench is fitted, so that said pivoted plate $i^5$ may be turned either to be wedged upon said plates $i^3\ i^3$, to short-circuit the current to the main wire, or, as shown in dotted lines in Fig. 12, to separate said plates electrically, save through the medium of the circuit-wires, which include the apparatus to be worked by the current. The cut-out switch may, of course, be constructed in other ways without departing from my invention so long as it may be operated from the surface of the ground by a key or wrench.

I reserve the right to file an application as a continuation of this present one with a claim to the combination of an underground conduit, having an electric conductor therein, a switch forming part of the circuit of said conductor, and an inclosing-casing connected with said conduit, leading upward, so as to permit said switch to be operated from the surface of the ground, or to substantially this subject-matter.

I also reserve the right to file an application with a claim to the improvement in the art of protecting and preserving the insulation of electric conductors contained in underground conduits, which consists in draining the water or condensed moisture from the conduit, and in subjecting the conductors at intervals to the action of a preservative fluid, together with a claim or claims to the organizations of parts herein described, which permit the carrying out of this process or improvement in the preservation of conductors.

I will also claim all other patentable matter not particularly claimed herein and the reservation is in nowise affected by the making and erasure of claims in the prosecution of this application.

I claim as my invention—

1. A longitudinally-divided conduit-section, the ends of which have coupling-flanges, and the edge of one of the divided conduit portions having a longitudinal interlocking flange or connection for the edge of the other portion thereof, which flange terminates before reaching the coupling-flanges at the ends of the conduit-section, in combination with a sectional internally-grooved or recessed clamp-coupling which receives the coupling-flange of the conduit-section and snugly fits around the end of said section to clamp the divided portions thereof together, substantially as described, whereby a tight joint between the edges of the divided portions of the conduit-section may be attained and a close fit between the coupling and conduit section secured.

2. A longitudinally-divided two-part conduit-section, the edge of one portion of said section being provided with an external longitudinal flange and a seat to receive the edge of the other portion thereof, and said flange being terminated before reaching the ends of the section, so as to afford a plain surface for the fitting of the coupling-connection between the adjacent sections of the conduit, substantially as described, whereby a tight joint may be made between the longitudinal edges of the section, and a close fit between the coupling-connection and the surface of the conduit-section be insured.

3. The combination of a conduit for electric conductors, cast with a tubular union-piece having a plain coupling-flange, a removable stopper to close the opening of said union-piece, and a sectional clamp-coupling, having a plain internal recess or groove embracing said coupling-flange and said stopper, substantially as described, whereby the stopper is securely locked in place while readily removable in making a branch connection with the conduit, and whereby also the branch pipe may be coupled to the union-piece by the same device that secures the stopper in position when said stopper is removed.

4. The combination of an underground conduit having branch openings with one or more electric conductors inclosed and supported thereby, having insulating-couplings in their lengths opposite said branch openings to facilitate making branch circuit-connections, substantially as described.

5. The combination of an electric conductor divided, and having its ends connected by an insulating-coupling, substantially as described, which permits said conductor to be kept taut or suspended between its supports with a conducting-connection, substantially as set forth, between the insulated ends of said conductor, capable of being severed without mechanically separating the ends of the conductor, substantially as described.

6. A cast-metal longitudinally-divided pipe-section having interlocking edges and a vertical central divison-plate supporting horizontal supports for the conductors, substantially as described.

In testimony whereof I have hereunto subscribed my name this 6th day of May, A. D. 1882.

ELI T. STARR.

Witnesses:
    WM. J. PEYTON,
    JAMES YOUNG.